United States Patent
Stierle et al.

(10) Patent No.: US 6,838,783 B2
(45) Date of Patent: Jan. 4, 2005

(54) WAKE UP SYSTEM FOR ELECTRONIC COMPONENT SUPPORTED ON A VEHICLE

(75) Inventors: Thomas Stierle, Auburn Hills, MI (US); Andre Payant, Madison Heights, MI (US); Daniel A. Martinez-Carrillo, Guadalajara (MX)

(73) Assignee: Siemens VDO Automotive Corporation, Auburn Hills, MI (US)

(*) Notice: Subject to any disclaimer, the term of this patent is extended or adjusted under 35 U.S.C. 154(b) by 460 days.

(21) Appl. No.: 10/094,422

(22) Filed: Mar. 8, 2002

(65) Prior Publication Data

US 2002/0140292 A1 Oct. 3, 2002

Related U.S. Application Data

(60) Provisional application No. 60/274,269, filed on Mar. 8, 2001.

(51) Int. Cl.[7] .................................................. B60L 1/00
(52) U.S. Cl. ...................................................... 307/10.1
(58) Field of Search ............................... 307/9.1, 10.1, 307/10.8, 18–21, 51, 52, 62, 85, 86

(56) References Cited

U.S. PATENT DOCUMENTS

| | | | | |
|---|---|---|---|---|
| 4,896,637 A | * | 1/1990 | Yamamoto | ............... 123/179.3 |
| 5,583,751 A | * | 12/1996 | Nakazawa et al. | ............ 363/20 |
| 5,714,806 A | * | 2/1998 | Goto et al. | ................ 307/10.1 |
| 5,834,854 A | * | 11/1998 | Williams | .................... 307/10.6 |
| 5,982,604 A | * | 11/1999 | Kojima et al. | ............... 361/159 |
| 6,060,834 A | * | 5/2000 | Vilkinofsky et al. | .......... 315/82 |
| 6,693,368 B2 | * | 2/2004 | Schumann et al. | ........ 307/10.1 |

FOREIGN PATENT DOCUMENTS

| | | |
|---|---|---|
| DE | 4305219 A1 | 8/1993 |
| DE | 10033257 A1 | 1/2002 |
| EP | 0435738 A2 | 7/1991 |
| EP | 0530472 A1 | 3/1993 |
| EP | 0773650 A2 | 5/1997 |

OTHER PUBLICATIONS

International Search Report mailed Oct. 18, 2002.

* cited by examiner

*Primary Examiner*—Matthew V. Nguyen

(57) ABSTRACT

A power control assembly limits the amount of leakage current absorbed by a device (30) supported on a vehicle when the device is in a sleep mode. The described example includes a switch (40) between a vehicle power source (54) and a power supply (50, 52) for the peripheral device. A locking portion (44) controls operation of the switch (40) so that selected portions of the device (30) are isolated from the vehicle power source (34) when the device (30) is in a sleep mode. A wake up signal received by a communication bus transceiver (32) activates the switch locking portion (44), which in turn allows the isolating switch (40) to be electrically closed and kept in the closed condition until the controller (54) of the device determines that the device should enter the sleep mode.

20 Claims, 2 Drawing Sheets

WAKE UP SYSTEM FOR ELECTRONIC COMPONENT SUPPORTED ON A VEHICLE

CROSS REFERENCE TO RELATED APPLICATIONS

This application claims priority to U.S. Provisional Application No. 60/274,269, which was filed on Mar. 8, 2001.

BACKGROUND OF THE INVENTION

This invention generally relates to controls for electronic devices that need to be awakened out of a sleep mode where wake up time is limited. More particularly, this invention relates to a unique switching strategy within a wake up system for such electronic devices.

Modern day vehicles include a variety of electronic components. The power consumption of all of these components can prove to be too much and designers are constantly facing the challenge of reducing power consumption while, at the same time, providing the same or enhanced options on a vehicle. One way of managing power consumption is to have various peripheral devices enter a sleep mode when the device is not in use.

There are a variety of strategies for causing such devices to enter a sleep mode and for waking up the devices as needed. Typical arrangements include a linear voltage regulator, which introduces expense. Cost-savings are a critical concern in automotive applications. Another difficulty with conventional approaches is that they are not universally applicable and cannot meet some of the more stringent requirements regarding parasitic leakage current and limited wake up times. This difficulty is particularly present in devices where an energy reserve is part of a power supply to boost a battery voltage to a higher voltage level for powering the electronics of a particular device.

In one example, the parasitic leakage current when a device is in sleep mode must be less than or equal to 500 micro amps. It is desirable to provide an arrangement that satisfies the low leakage current requirements, is versatile enough to be useful with a variety of devices, facilitates a fast wake up response and is cost effective to implement. This invention addresses those needs while avoiding the shortcomings of prior arrangements.

SUMMARY OF THE INVENTION

In general terms, this invention is an assembly for controlling power consumption of at least one device supported on a vehicle that has a communication bus over which signals are transmitted to or from the device.

The inventive assembly includes a controller that controls operation of the device. A power supply portion derives power from a vehicle power source, such as a battery, and provides power to the controller. A switch is placed between the power supply portion and the vehicle power source. The switch selectively opens the connection between the power supply portion and the vehicle power source when the device is in a sleep mode and closes the connection when the device is in an active mode. A transceiver receives a wake up signal provided on the communication bus. A switch locking portion responds to the wake up signal received by the transceiver to lock the switch into the closed position. The switch locking portion maintains the switch in the closed position until the controller provides an indication that the device is to enter the sleep mode.

A significant advantage to the incentive approach is that it does not require a regulated voltage.

In one example, the switch locking portion comprises a plurality of transistors, arranged to lock the switch into a conducting state while the device is in the active mode. The controller provides a signal that unlocks the switch when the controller determines that the device should enter into the sleep mode.

In one example implementation of this invention, the switch locking device comprises a mono-flop that moves from a non-conducting state, which holds the switch open, to a conducting state, which closes the switch. Once in the conducting state, the mono-flop is unable to exit that state until it is reset by the controller determining that the device should enter the sleep mode.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
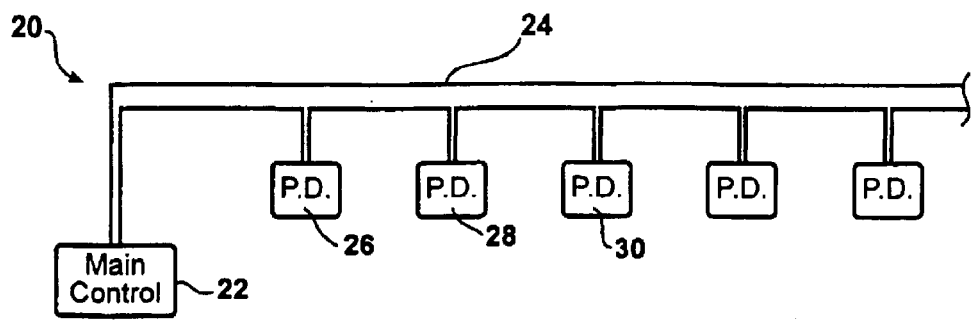
FIG. 1 schematically illustrates an arrangement of a plurality of peripheral devices on a vehicle each being connected with a communication bus.

As schematically shown in FIG. 1, a communication network 20 facilitates communications between a main control 22, for example over a communication bus 24 with a plurality of peripheral devices 26, 28 and 30. The illustrated arrangement can be particularly useful on a vehicle, for example, where the peripheral devices include items such as an airbag controller that enter a sleep mode to conserve energy. The main control 22 in one example provides a wake up signal on the bus 24 to wake up the devices 26, 28 and 30 as needed.

The communication bus 24 in one example is a CAN communication bus as known. The plurality of peripheral devices receive and transmit signals that are propagated along the communication bus 24 in a known manner. The inventive arrangement is particularly well suited for controlling an amount of leakage current absorbed by the peripheral devices when they are in a sleep mode and for waking up the devices using a wake up signal promulgated along the communication bus 24.

Figure 2:
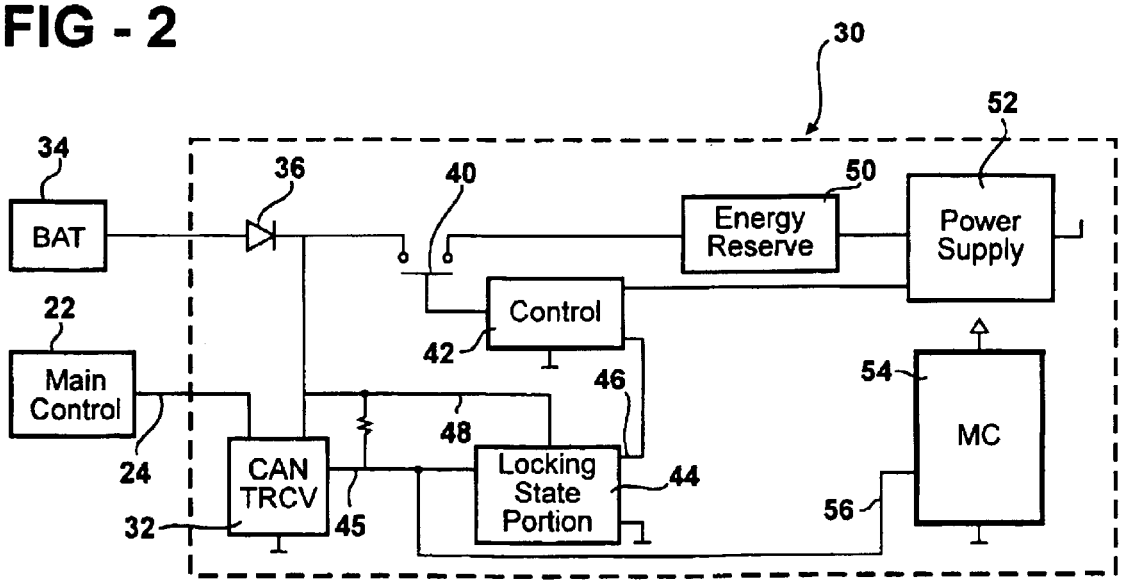
FIG. 2 schematically illustrates a power supply control assembly designed according to this invention.

As can be appreciated from FIG. 2, an example one of the peripheral devices 30 is schematically illustrated with only selected portions of that device being shown in the drawing. The main control 22 provides signals along the communication bus 24 that are processed through a transceiver 32. In the illustrated example, the transceiver 32 comprises a conventional CAN transceiver as known in the art.

A vehicle power source 34 such as a car battery provides a supply of energy to the device 30 through a rectifier 36. A switch 40 selectively separates the power source 34 from selected ones of the components within the device 30 when the device is in a sleep mode.

A switch control 42 operates the switch 40 to electrically open or close the switch to provide a selective coupling between the power source 34 and other components within the device 30. The switch control 42 is powered based upon the operation of a switch locking portion 44 that is responsive to a signal on an input 45 from the transceiver 32 indicating that a wake up signal was received from the bus line 24. The switch locking portion 44 provides an output signal at 46 to the control 42. The power to the switch control 42 is derived from the vehicle power source 34. The same power source 34 powers the switch locking portion 44 along an input 48.

The switch locking portion 44 receives an input signal at 45 from the transceiver 32. The transceiver 32 preferably responds to a wake up signal on the communication bus 24 by transmitting the signal at 45. In one example, the wake up signal comprises a 7 volt signal on the communication bus 24. The 7 volt signal, as known, is used for a wake up signal because it has a higher voltage than standard communication or control signals provided along the communication bus 24. The switch locking portion 44 enables the switch control 42 to change the switch 40 from a non-conductive state to a conducting state. Once activated, the control 42 closes the switch 40, which couples the power supply portion of the device 30 to the power source 34. The locking portion ensures that the control 42 keeps the switch 40 closed until the device 30 should enter the sleep mode once again.

The illustrated example includes an energy reserve portion 50 and a power supply portion 52, each of which comprise components as known in the art. The energy reserve portion 50 facilitates boosting the battery voltage of the energy source 34 to a higher voltage. In some examples the boosted voltage may be 23 or 33 volts, for example whereas the battery voltage is typically between 8 and 16 volts.

The power supply portion 52 provides the primary power to the device controller 54. When the controller 54 determines that the device 30 should enter the sleep mode, a reset signal is provided to the switch locking portion 44 along the output 56, which causes the switch locking portion 44 to effectively cut off the control 42 from the vehicle power source 34, which results in the switch 40 being opened.

Figure 3:
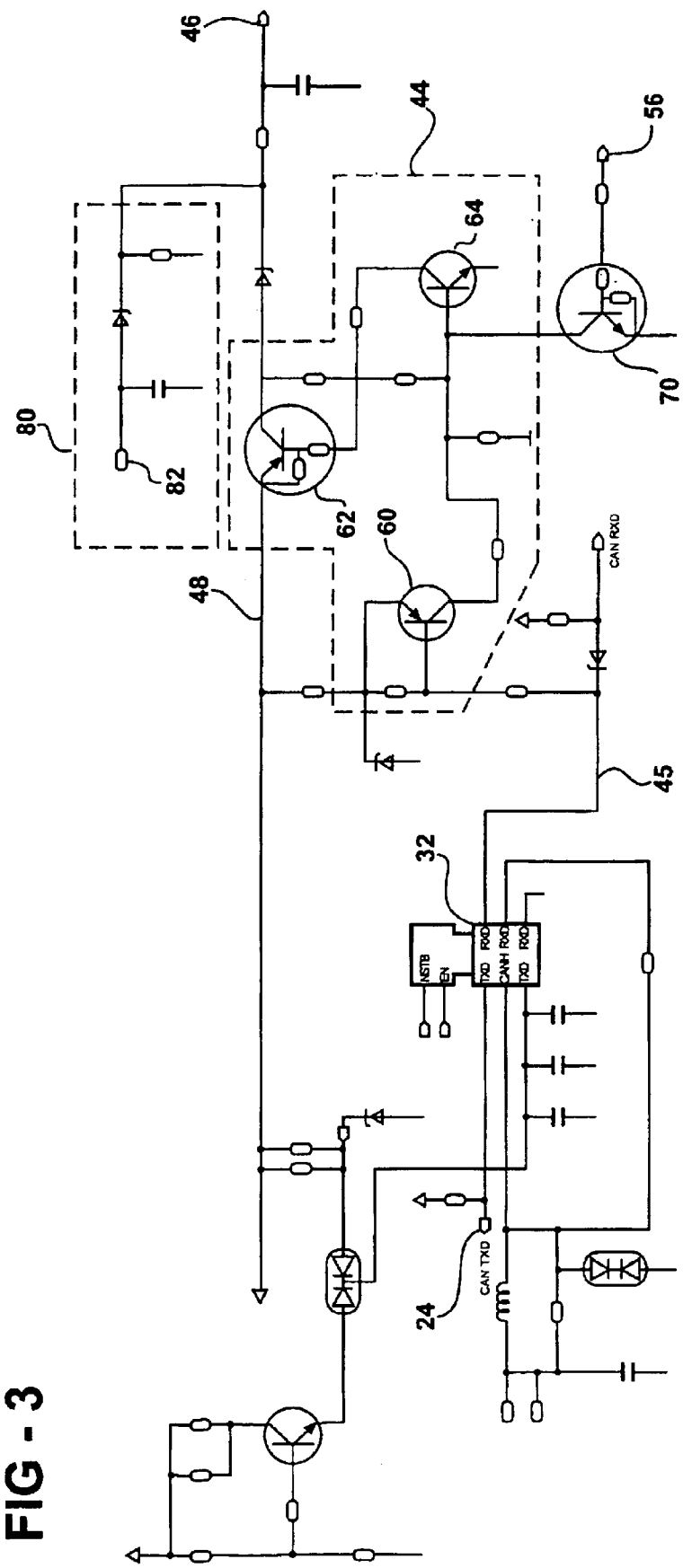
FIG. 3 schematically illustrates in more detail, a selected portion of the embodiment of FIG. 2.

FIG. 3 schematically illustrates one example implementation of a switch locking portion 44 designed according to this invention. In the illustrated example, the switch locking portion 44 includes a plurality of transistors arranged so that a wake up signal received by the transceiver 32 causes the switch locking portion 44 to change to a conductive state allowing the control 42 to receive battery power to close the switch 40. In the illustrated example, the transistors 60, 62 and 64 are arranged, as can be appreciated from the illustration, in a manner so that the falling edge of a signal from the transceiver 32 at 45 results in the transistor 62 locking into a conductive state. Once the locking portion is locked, the power output at 46 is available to the control 42, which in turn closes the switch 40. The control 42 continues to maintain the switch 40 in a closed position as long as the transistor 62 is conducting between the input 48 (i.e., the power source 34) and the output 46.

In the illustrated example, the base of the transistor 60 is held such that the transistor 60 is nonconducting when the device 30 is in the sleep mode. In the illustrated example, the transistor 60 and 64 are part of the same component and are interrelated such that when one is nonconducting, the other is nonconducting. When the transceiver 32 provides an output responsive to a wake up signal on the communication bus 24, the falling edge of that output enables the transistor 60 and the transistor 64 to be conducting. Once the transistors 60 and 64 are conducting, the base of the transistor 62 is effectively coupled through resistors to the vehicle power source 34. At this point, the transistor 62 is conducting and the voltage of the vehicle power source 34 is available at 46 to the switch control 42.

In this condition, the transistor 64 is unable to stop conducting. Accordingly, it matters not whether the transistor 60 opens or closes once the transistor 62 is conducting. As such, the switch locking portion 44 is unable to independently switch itself out of a conductive state once the transistor 62 is conducting and effectively providing power to the switch control 42.

Because the switch locking portion 44 changes from a non-conductive state to a conductive state and cannot change itself out of the conducting state, the illustrated example can be referred to as a mono-flop. The use of such a mono-flop locking portion ensures power supply to the switch control 42 maintains the switch 40 in a conductive state as long as the device 30 is to be active.

Once the controller 54 determines that the device 30 should enter the sleep mode, it provides a reset signal at 56 to the base of a transistor 70. As the controller 54 in the illustrated example pulls down the base of the transistor 70, that pulls the base of transistor 64 to ground, which grounds the base of the transistor 62. This cuts off the power source 34 from the control 42, which in turn results in the control 42 opening the switch 40. An example situation where the controller 54 determines that the device should enter the sleep mode is when a specific function required of the device has been completed or when a wake up signal is received followed by no further signals within a specified period.

The illustrations show one example implementation of this invention. Various modifications and other so-called mono-flop devices can be used to control the operation of a switch such as the switch 40 to provide power to the device 30 when it is in an active mode. The illustrated example is particularly advantageous because the leakage current is approximately 200 micro amps when the device is in the sleep mode and no regulated voltage is required.

The illustrated example includes an ignition logic level portion 80 that is supplemental to the switch locking portion 44 so that the device 30 can be woken up by a signal as known other than a wake up signal received from the communication bus 24.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An assembly for controlling power consumption of at least one device supported on a vehicle having a communication bus over which signals are transmitted to or from the device, comprising:

a controller that controls operation of the device;

a power supply portion that derives power from a vehicle power source and provides power to the controller;

a switch between the power supply portion and the vehicle power source, the switch having an open state opening the connection between the power supply portion and the vehicle power source when the device is in a sleep mode and a closed state closing the connection when the device is in an active mode;

a transceiver that responds to a wake up signal provided on the communication bus; and a switch locking portion that responds to the transceiver to lock the switch into the closed state, the switch locking portion maintaining the switch in the closed state until the controller provides an indication that the device is to enter the sleep mode.

2. The assembly of claim 1, wherein the switch locking portion comprises a first transistor switch that is activated by an output from the transceiver that is responsive to the wake up signal and a second transistor that is activated responsive to the first transistor being activated, the second transistor remains in the activated state regardless of a change in state of the first transistor.

3. The assembly of claim 2, wherein the second transistor changes out of the activated state only responsive to a command from the controller indicating that the device is to enter the sleep mode.

4. The assembly of claim 1, including a power control portion that activates the switch and places the switch into the closed state when the switch locking portion allows the vehicle power source to power the power control portion.

5. The assembly of claim 1, wherein the power supply portion includes an energy reserve element that stores electrical energy that is at least partially provided to power the controller.

6. The assembly of claim 1, wherein the wake up signal comprises a signal having a voltage that is above a selected threshold.

7. The assembly of claim 1, wherein the power supply portion has a leakage current draw that is greater than about 500 microamperes when the switch is closed and wherein the switch locking portion has a leakage current draw that is less than about 200 microamperes.

8. The assembly of claim 1, wherein the assembly has a leakage current draw less than about 500 microamperes when the device is in the sleep mode.

9. The assembly of claim 8, wherein the assembly has a leakage current draw of about 200 microamperes when the device is in the sleep mode.

10. The assembly of claim 1, wherein the switch locking portion comprises a monoflop circuit.

11. A method of powering a device supported on a vehicle, the device including a power supply portion that powers a controller of the device, comprising the steps of:
   providing a switch between the power supply portion and a vehicle power source;
   opening the switch to isolate the power supply portion from the vehicle power source when the device is in a sleep mode;
   locking the switch to couple the power supply portion to the vehicle power source when the device is not in the sleep mode.

12. The method of claim 11, wherein the vehicle power source comprises a battery and the power supply portion comprises an energy reserve module that is operative to boost a voltage available from the power supply portion such that the boosted voltage is greater than a voltage of the battery.

13. The method of claim 11, including unlocking the switch only in response to a command from the device controller indicating that the device is to enter the sleep mode.

14. The method of claim 11, including providing a switch locking portion that permits the switch to be closed and locks the switch in the closed condition until a command from the device controller resets the switch locking portion to open the switch so that the device enters the sleep mode.

15. A system for controlling power consumption by at least one device supported on a vehicle, comprising:
   a vehicle power source;
   a device controller;
   a device power supply that provides power to the controller;
   a switch between the vehicle power source and the device power supply that opens to selectively isolate the power source from the power supply when the device is in a sleep mode and closes to selectively couple the power source to the power supply;
   a switch locking portion that is operative to lock the switch closed responsive to a wake up signal indicating that the device should be activated out of the sleep mode, the switch locking portion only unlocking the switch responsive to a command from the device controller indicating that the device should enter the sleep mode.

16. The system of claim 15, including a communication bus and a transceiver that receives the wake up signal from the communication bus.

17. The system of claim 15, wherein the switch locking portion includes a first transistor, a second transistor and a third transistor, the first transistor conducting responsive to the wake up signal, the second and third transistors conducting responsive to the first transistor conducting wherein the second transistor is associated with the third transistor such that once the second transistor begins conducting, the third transistor is unable to stop conducting until the controller resets the switch locking portion.

18. The system of claim 17, including a resetting transistor coupled with the second transistor such that a sleep command from the controller grounds the resetting transistor thereby grounding the second transistor and changing the third transistor to a nonconductive state.

19. The system of claim 17, wherein the third transistor conducts to provide power from the vehicle power source to the switch to electrically close the switch.

20. The system of claim 19, including a switch control that operates the switch and wherein the switch control receives battery power through the third transistor.

* * * * *